(12) United States Patent
Iwabuchi et al.

(10) Patent No.: US 10,969,286 B2
(45) Date of Patent: Apr. 6, 2021

(54) PRESSURE SENSOR

(71) Applicant: MIKUNI CORPORATION, Tokyo (JP)

(72) Inventors: Junki Iwabuchi, Aichi (JP); Tatsunori Yamada, Seto (JP); Tomoya Sato, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 221 days.

(21) Appl. No.: 16/316,383

(22) PCT Filed: Oct. 25, 2017

(86) PCT No.: PCT/JP2017/038569
§ 371 (c)(1),
(2) Date: Jan. 9, 2019

(87) PCT Pub. No.: WO2018/079622
PCT Pub. Date: May 3, 2018

(65) Prior Publication Data
US 2019/0250056 A1    Aug. 15, 2019

(30) Foreign Application Priority Data

Oct. 26, 2016  (JP) .............................. JP2016-209297

(51) Int. Cl.
*G01L 1/16*    (2006.01)
*G01L 9/08*    (2006.01)
(Continued)

(52) U.S. Cl.
CPC .............. *G01L 9/08* (2013.01); *G01L 9/0052* (2013.01); *G01L 19/04* (2013.01); *G01L 23/10* (2013.01); *G01L 23/26* (2013.01)

(58) Field of Classification Search
CPC ..... G01L 1/00; G01L 1/16; G01L 9/00; G01L 9/0052; G01L 9/08; G01L 19/00;
(Continued)

(56) References Cited

U.S. PATENT DOCUMENTS 3,364,368 A   1/1968 Sonderegger
5,739,626 A   4/1998 Kojima et al.
(Continued)

FOREIGN PATENT DOCUMENTS

GB    1 207 562 A    10/1970
JP    2004-264037 A   9/2004
(Continued)

OTHER PUBLICATIONS

Communication dated May 26, 2020, issued by the European Patent Office in counterpart European Application No. 17866124.5.
(Continued)

*Primary Examiner* — Nguyen Q. Ha
(74) *Attorney, Agent, or Firm* — Sughrue Mion, PLLC

(57) ABSTRACT

A pressure sensor including a housing extending along an axial line, a diaphragm fixed to a front-end side of the housing, a piezoelectric unit disposed in a hole in the housing and including a piezoelectric element, a transmission member that transmits deformation of the diaphragm to the piezoelectric unit, and a guide member having a through hole extending along the axial line and surrounding the piezoelectric unit in the through hole. (SL/AL)≤0.26 is satisfied in the cross section perpendicular to the axial line passing through the piezoelectric element, where SL is the maximum value of the distance in the radial direction between the center of the through hole and the center of the piezoelectric element and AL is the maximum value of the
(Continued)

distance in the radial direction between the outside surface of the piezoelectric element and the center of the through hole.

6 Claims, 6 Drawing Sheets

(51) Int. Cl.
*G01L 19/14* (2006.01)
*G01L 23/10* (2006.01)
*G01L 19/04* (2006.01)
*G01L 9/00* (2006.01)
*G01L 23/26* (2006.01)

(58) Field of Classification Search
CPC ......... G01L 19/04; G01L 19/06; G01L 19/14; G01L 23/00; G01L 23/10; G01L 23/22; G01L 23/26
See application file for complete search history.

(56) References Cited

U.S. PATENT DOCUMENTS

| | | | |
|---|---|---|---|
| 7,603,906 B2 | 10/2009 | Kroger et al. | |
| 7,726,196 B2 * | 6/2010 | Friedl | G01L 9/008 73/721 |
| 2007/0277618 A1 | 12/2007 | Kroeger et al. | |
| 2010/0294028 A1 | 11/2010 | Siegenthaler et al. | |

FOREIGN PATENT DOCUMENTS

| | | | | |
|---|---|---|---|---|
| JP | 2010-271321 A | 12/2010 | | |
| JP | 2011-203103 A | 10/2011 | | |
| JP | 2013140044 A * | 7/2013 | ............. | G01L 23/10 |
| WO | 2013/147260 A1 | 10/2013 | | |

OTHER PUBLICATIONS

Communication dated Jun. 22, 2020, from the State Intellectual Property Office of People's Republic of China in corresponding Application No. 201780064909.5.

International Search Report (PCT/ISA/210) dated Jan. 16, 2018 issued by the International Searching Authority in International Application No. PCT/JP2017/038569.

Communication dated Nov. 13, 2018 issued by the Japanese Patent Office in counterpart Japanese Application No. 2016-209297.

* cited by examiner

[FIG.1]
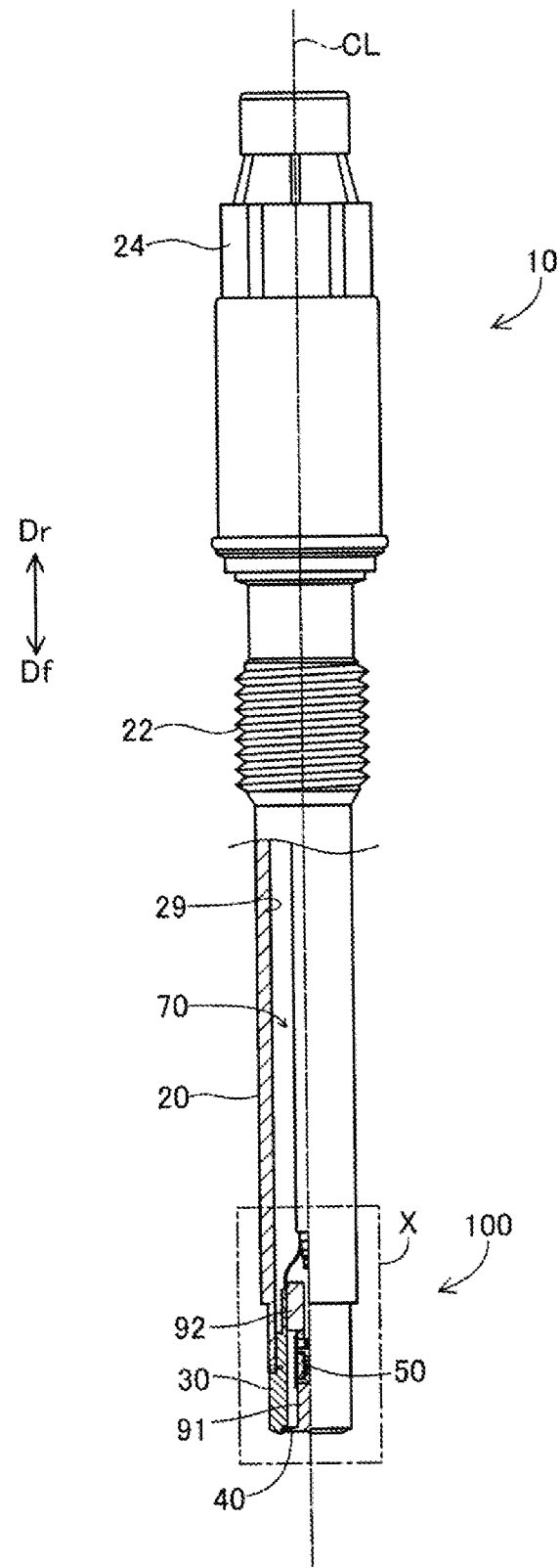

[FIG.2]
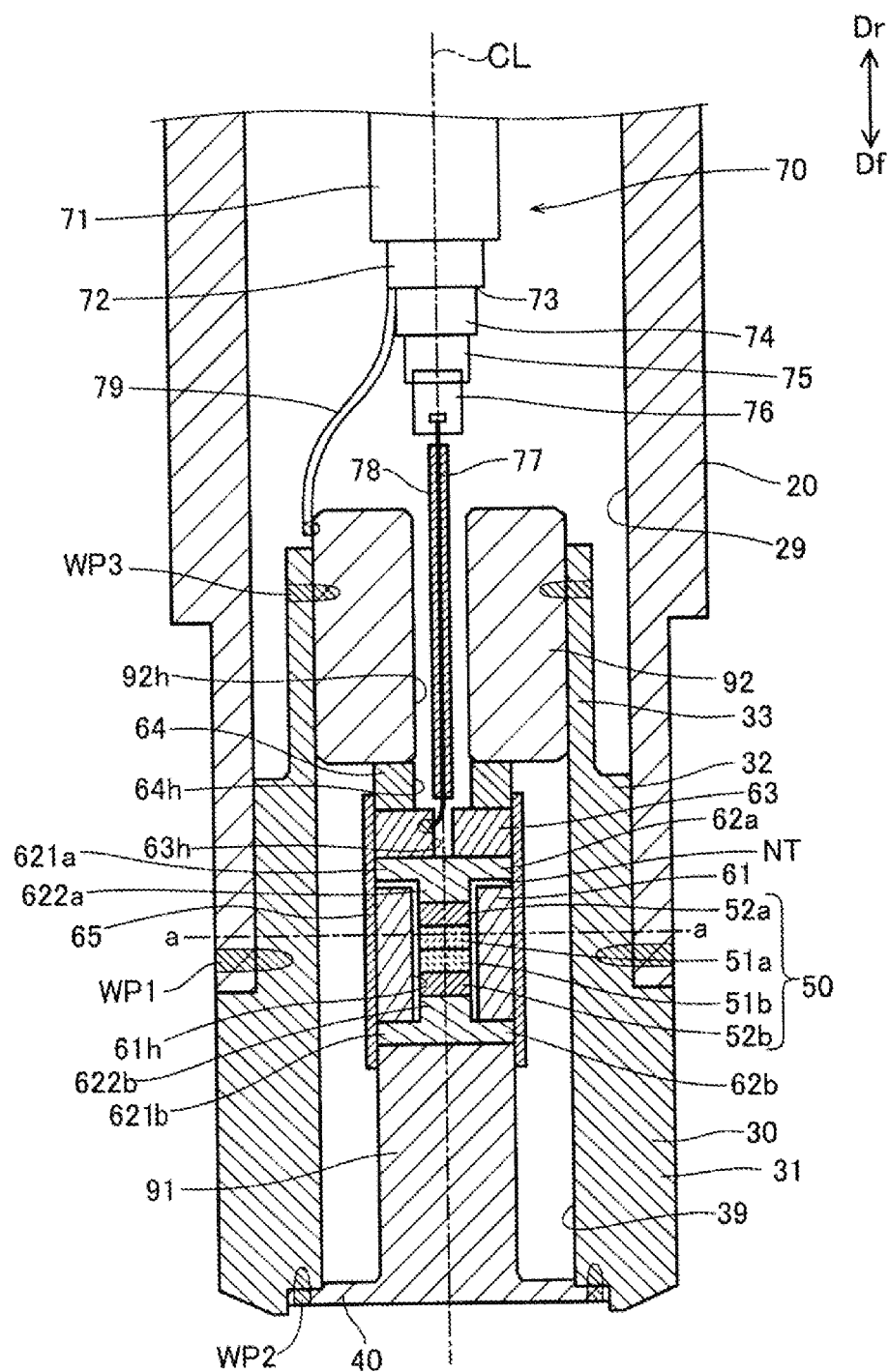

[FIG.3]
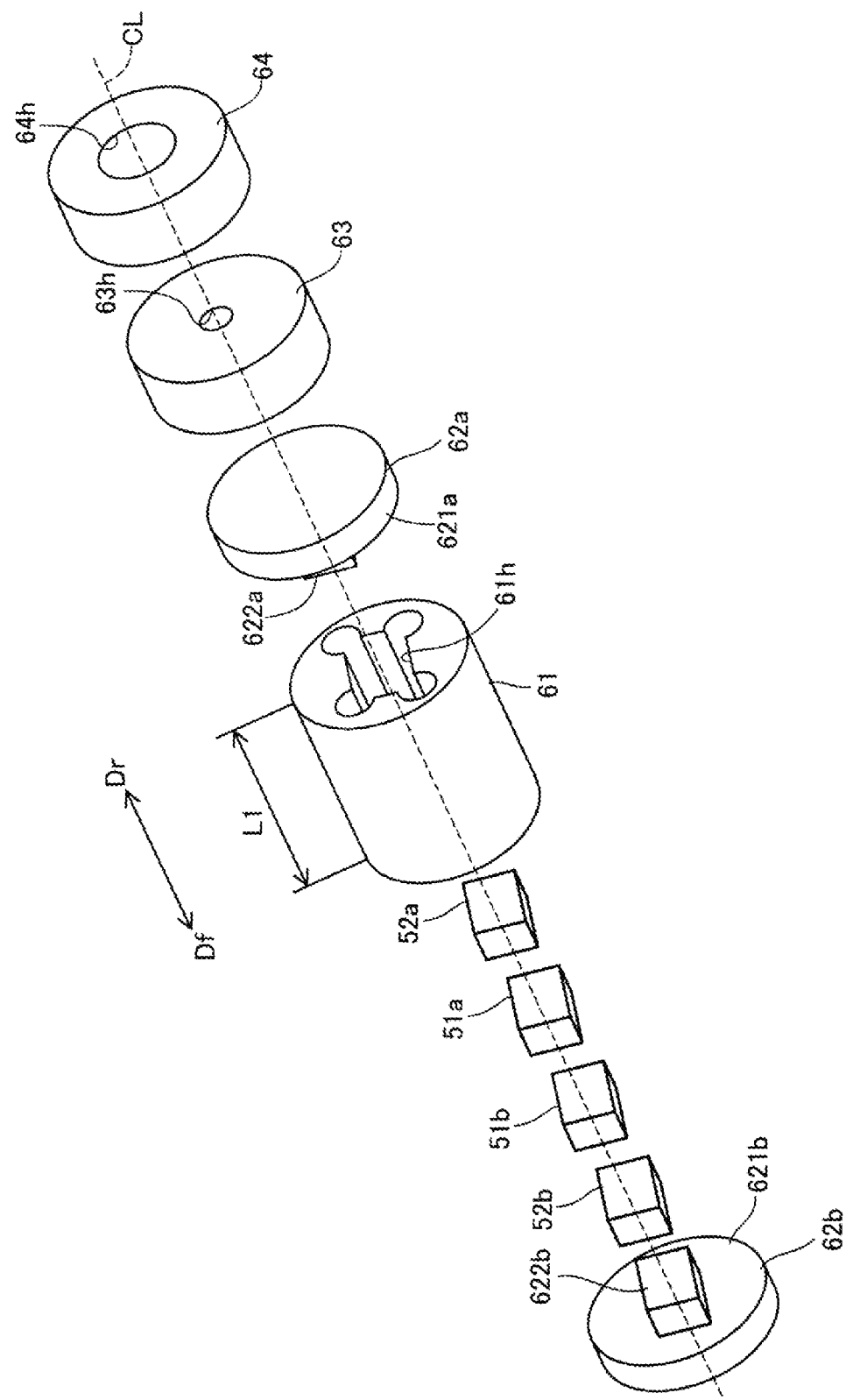

[FIG.4]
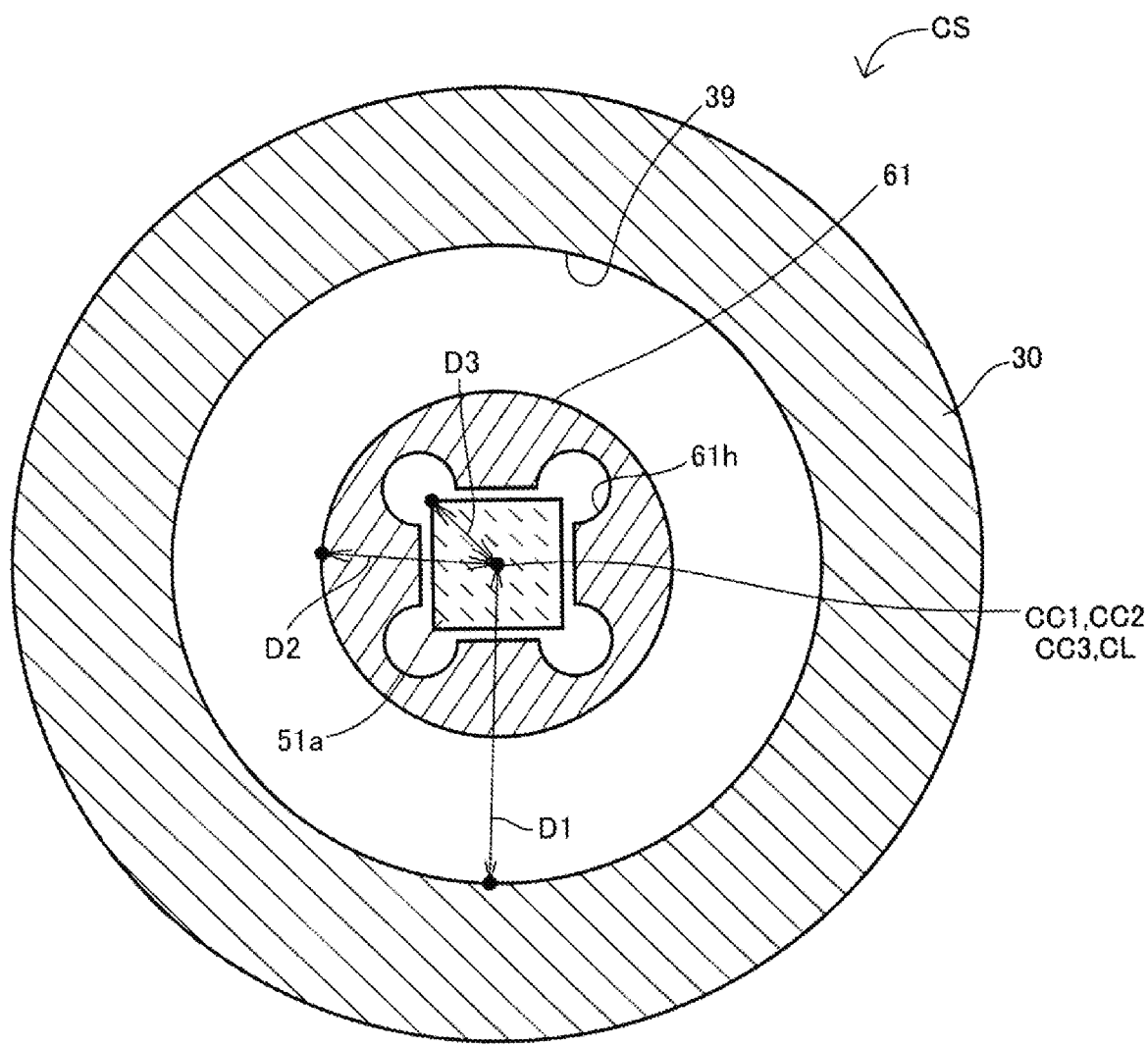

[FIG.5]
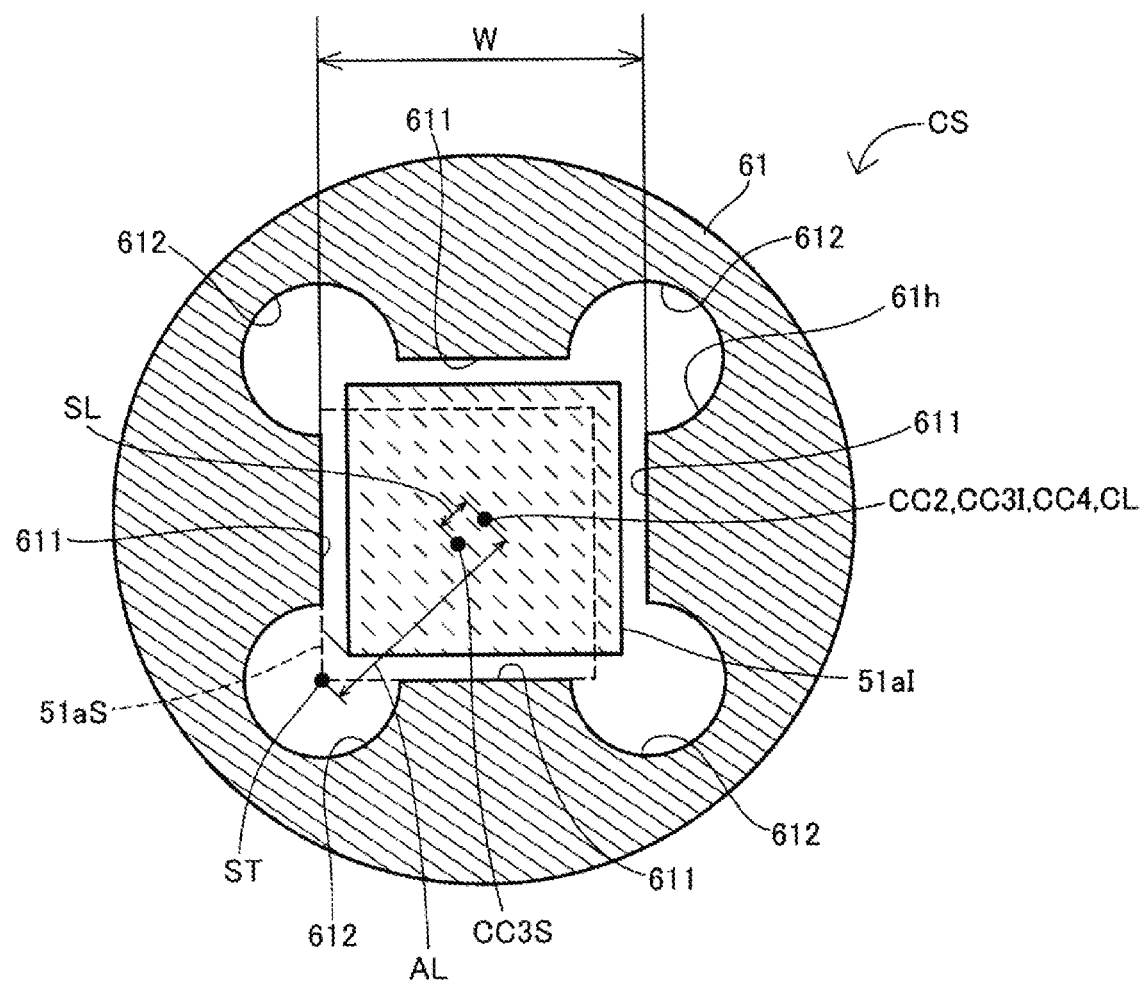

[FIG.6]
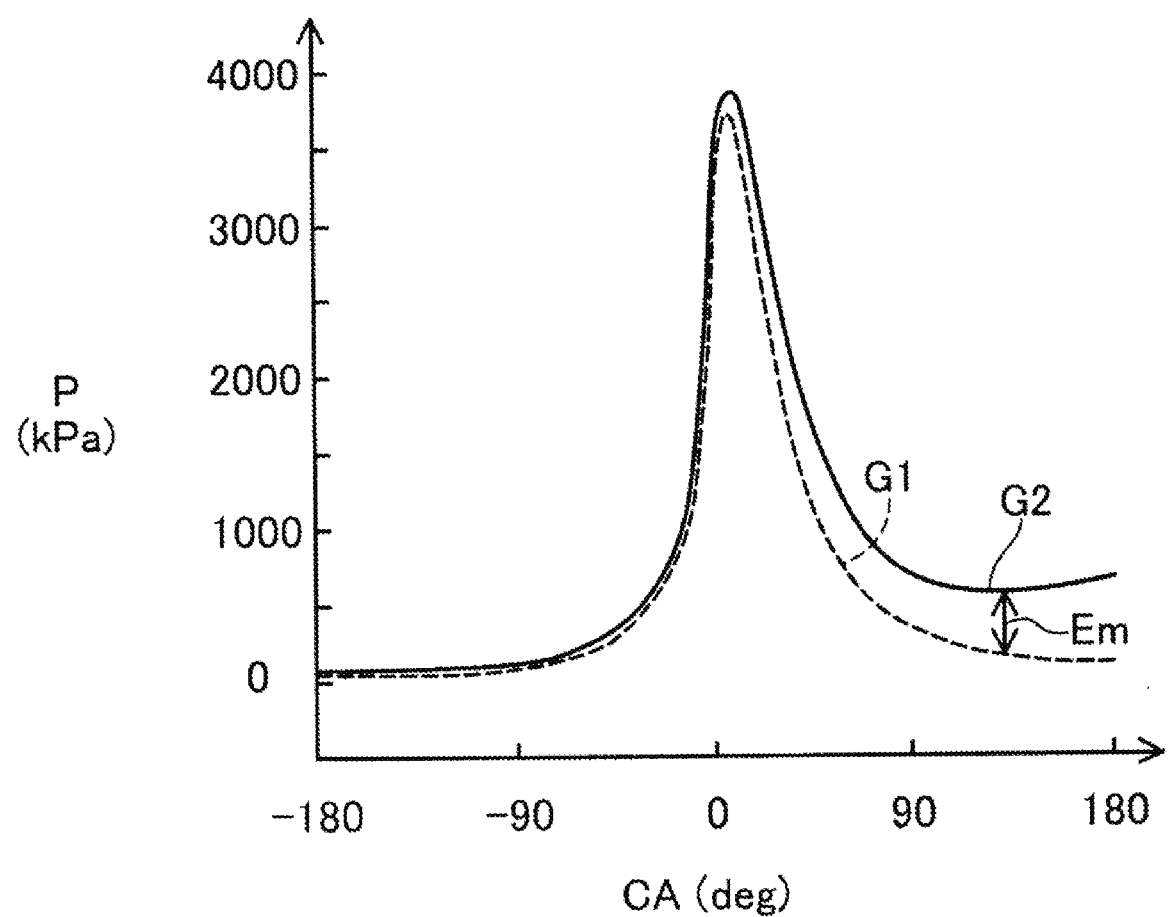

PRESSURE SENSOR

CROSS REFERENCE TO RELATED APPLICATIONS

This application is a National Stage of International Application No. PCT/JP2017/038569, filed Oct. 25, 2017, claiming priority based on Japanese Patent Application No. 2016-209297, filed Oct. 26, 2016.

TECHNICAL FIELD

The present invention relates to a pressure sensor for detecting pressure in a combustion chamber in an internal combustion engine or the like.

BACKGROUND ART

Pressure sensors have been proposed which comprise a diaphragm, a piezoelectric element and a transmission member (e.g., a rod). When the diaphragm is deformed in response to pressure in a combustion chamber, the transmission member is displaced in a predetermined direction to apply force to the piezoelectric element. The piezoelectric element outputs an electrical charge (i.e., a voltage) that corresponds to the applied force. As a result, the pressure in the combustion chamber can be detected by measuring the electrical charge outputted from the piezoelectric element.

In order to stabilize the charge outputted from the piezoelectric element, the pressure sensor is assembled with a preload applied to the piezoelectric element. For example, in Patent Document 1, the piezoelectric element is assembled in a state in which the piezoelectric element is stored in a holder inserted in contact with a sensor housing.

PRIOR ART DOCUMENT

Patent Document

Patent Document 1: JP-A-2010-271321

SUMMARY OF THE INVENTION

Problem to be Solved by the Invention

Here, by reducing the cross-sectional area perpendicular to the axial line of the piezoelectric element and/or increasing the length of the piezoelectric element in the axial direction, the insulation resistance value of the piezoelectric element can be increased. Since current leakage can be suppressed by increasing the insulation resistance value of the piezoelectric element, measurement accuracy of the pressure sensor can be improved. However, for example, reducing the cross-sectional area perpendicular to the axial line of the piezoelectric element and/or stacking a plurality of piezoelectric elements to increase the length of the piezoelectric element in the axial direction may cause displacement in a radial direction of the piezoelectric element when a preload is applied. If a desired preload cannot be applied due to such displacement in the radial direction of the piezoelectric element, there is a possibility that the pressure sensor will not exhibit a desired measurement performance. For this reason, there has been demand for a technique for suppressing displacement of the piezoelectric element position in the radial direction.

The present specification discloses a technique for suppressing displacement of the position of a piezoelectric element in the radial direction in a pressure sensor.

Means for Solving the Problem

The techniques disclosed in this specification can be implemented according to the following application examples.

[Application Example 1] A pressure sensor comprising:
a cylindrical housing extending along an axial line;
a diaphragm, which is fixed to a front-end side of the housing, and which is deformable in response to received pressure;
a piezoelectric unit, which is disposed in a hole in the housing, and which comprises two or more stack members including one or more piezoelectric elements; and
a transmission member that transmits a deformation of the diaphragm to the piezoelectric unit, wherein:
the pressure sensor further comprises a guide member, which has a through hole extending along the axial line, and which surrounds at least a part of an outer periphery of the piezoelectric unit; and
in a cross section perpendicular to the axial line passing through the piezoelectric element, the following relationship is satisfied:

$$(SL/AL) \leq 0.26$$

where SL is a maximum radial distance between a center of the through hole and a center of the piezoelectric element in the through hole, and
AL is a maximum radial distance between an outside surface of the piezoelectric element and the center of the through hole.

According to the above configuration, it is possible to suppress displacement of the piezoelectric element in a radial direction with the guide member.

[Application Example 2] The pressure sensor according to Application Example 1, wherein: the guide member is not in contact with the housing; and
In the cross section, the following relationship is satisfied:

$$(S2/S1) \leq 0.65$$

where S1 is an area of a first circle with a radius equal to a minimum distance D1 from a center of the hole in the housing to an inside surface of the housing, and
S2 is an area of a second circle with a radius equal to a maximum distance D2 from a center of the guide member to an outside surface of the guide member.

According to the above configuration, for example, since the distance between the guide member and the housing can be ensured, it is possible to prevent the piezoelectric element from overheating.

[Application Example 3] The pressure sensor according to Application Example 1 or 2, wherein:
the stack members include a rear-end stack member provided at a rear-end side of the piezoelectric element and a front-end stack member provided at a front-end side of the piezoelectric element;
the pressure sensor further comprises a rear-end pressing member that presses the rear-end stack member in a front-end direction and a front-end pressing member that presses the front-end stack member in a rear-end direction; and
a gap is provided between at least one of: the front-end surface of the guide member and the front-end pressing member;
and the rear-end surface of the guide member and the rear-end pressing member.

According to the above configuration, an appropriate preload can be applied to two or more stack members, including the piezoelectric elements, by the front-end pressing member and the rear-end pressing member.

[Application Example 4] The pressure sensor according to Application Example 2, wherein in the cross section, the following relationship is satisfied:

$$(S3/S1) \leq 0.5$$

where S3 is an area of a third circle with a radius equal to the maximum distance D3 from the center of the piezoelectric element to an outside surface of the piezoelectric element.

According to the above configuration, since the size of the piezoelectric element in the radial direction is small with respect to the size of the hole in the housing in the radial direction, when displacement of the piezoelectric element in the radial direction is likely to occur, the displacement of the piezoelectric element in the radial direction can be suppressed by the guide member.

[Application Example 5] The pressure sensor according to any one of Application Examples 1 to 4, wherein the piezoelectric unit includes two or more piezoelectric elements.

According to the above configuration, it is possible to suppress displacement of the piezoelectric elements in the radial direction with the guide member when the piezoelectric elements are likely to be displaced in the radial direction as a result of having two or more piezoelectric elements.

Further, the technology disclosed in this specification can be implemented in various modes, for example, a pressure sensor, an internal combustion engine in which the pressure sensor is mounted, or the like.

BRIEF DESCRIPTION OF THE DRAWINGS

FIG. 1 is an explanatory diagram showing a pressure sensor 10 of an embodiment.

FIG. 2 is an enlarged view of a front-end unit 100 vicinity of the pressure sensor 10 according to the embodiment.

FIG. 3 is an exploded perspective view of a piezoelectric unit 50, a guide member 61, a rear-end pressing member 62a, a front-end pressing member 62b, a wire connecting member 63, and an insulator 64.

FIG. 4 is a diagram showing a cross section CS of the front-end unit 100 taken through a piezoelectric element 51a in a plane perpendicular to an axial line CL.

FIG. 5 is an enlarged view of a portion of the cross section CS which includes the guide member 61 and the piezoelectric element 51a.

FIG. 6 is a graph showing an example of a waveform of pressure measured by the pressure sensor.

MODES FOR CARRYING OUT THE INVENTION

A. Embodiments

A-1: Configuration of the Pressure Sensor 10

FIG. 1 is an explanatory diagram illustrating a pressure sensor 10 of an embodiment. An axial line CL is a central axis of the pressure sensor 10. Hereinafter, the direction parallel to the axial line CL is also referred to as the "axial direction". The radial direction of a circle centered on the axial line CL on a plane perpendicular to the axial line CL is also simply referred to as the "radial direction", and the circumferential direction of the circle is also simply referred to as the "circumferential direction". The direction along the axial line CL, which is directed downward in FIG. 1, is referred to as the "front-end direction Df", and the opposite direction of the front-end direction Df is referred to as the "rear-end direction Dr". The front-end direction Df side is called the "front-end side", and the rear-end direction Dr side is also called the "rear-end side". FIG. 1 shows a cross-sectional structure of the front-end side portion of the pressure sensor 10 on the left side of the axial line CL. This cross-section is a planar cross-section that includes the axial line CL. FIG. 1 shows the external structure of other portions of the pressure sensor 10.

The pressure sensor 10 of the present embodiment is installed in an internal combustion engine and is used to detect pressure in a combustion chamber of the internal combustion engine. As shown in FIG. 1, the pressure sensor 10 includes, as main constituent elements, a cylindrical metal fitting 20, a front-end unit 100, and a cable 70.

The cylindrical metal fitting 20 has a substantially cylindrical shape extending along the axial line CL, and the cylindrical metal fitting 20 has an axial hole 29 that extends along the axial line CL. The cylindrical metal fitting 20 is made of a conductive metal such as stainless steel.

A threaded portion 22 and a tool engaging portion 24 are provided on an outer peripheral surface on the rear-end side of the cylindrical metal fitting 20. The threaded portion 22 is provided with threaded grooves for securing the pressure sensor 10 to a cylinder head of an internal combustion engine. The tool engaging portion 24 has an outer peripheral shape (for example, a hexagonal cross section) with which a tool (not shown) used for mounting and removing the pressure sensor 10 engages.

FIG. 2 is an enlarged view of the front-end unit 100 vicinity of the pressure sensor 10 according to the embodiment. Specifically, FIG. 2 is an enlarged cross-sectional view of a portion shown as region X in FIG. 1. This cross section includes the axial line CL. The front-end unit 100 includes a housing 30, a diaphragm 40, a piezoelectric unit 50, a guide member 61, a rear-end pressing member 62a, a front-end pressing member 62b, a wire connecting member 63, an insulator 64, a cover 65, a transmission rod 91, and a rear-end insertion member 92. As shown in FIG. 2, the axial line CL of the pressure sensor 10 is the axial line of the front-end unit 100, and is the axial line of each of the members 30, 40, 50, 61, 62a, 62b, 63, 64, 65, 91, 92 constituting the front-end unit 100.

The housing 30 has a substantially cylindrical shape extending along the axial line CL and has an axial hole 39, which is a through hole extending along the axial line CL. The housing 30 includes a large outer diameter portion 31 on the front-end side, a small outer diameter portion 33 on the rear-end side, and a middle outer diameter portion 32 between the large outer diameter portion 31 and the small outer diameter portion 33. The outer diameter of the large outer diameter portion 31 is larger than the outer diameter of the small outer diameter portion 33. The outer diameter of the middle outer diameter portion 32 is smaller than the outer diameter of the large outer diameter portion 31 but larger than the outer diameter of the small outer diameter portion 33. The middle outer diameter portion 32 of the housing 30 is inserted into the front end of the cylindrical metal fitting 20, and the middle outer diameter portion 32 and the cylindrical metal fitting 20 are joined at the front end of the cylindrical metal fitting 20 by laser welding via a welding portion WP1. When the pressure sensor 10 is installed in the internal combustion engine, the large outer diameter portion 31 is exposed from the cylinder head of the internal combustion engine to the combustion chamber. The housing 30 is made of a conductive metal such as stainless steel in the same manner as the cylindrical metal fitting 20.

The diaphragm 40 is a film having a disk shape centered on the axial line CL and is made of a conductive metal such as stainless steel. The diaphragm 40 is fixed to the front-end side of the housing 30. Specifically, the outer peripheral edge of the diaphragm 40 is joined to the front end of the housing 30 (the large outer diameter portion 31) by laser welding via a welding portion WP2 over the entire circumference. When the pressure sensor 10 is installed in the internal combustion engine, the diaphragm 40 receives the pressure in the combustion chamber at the front-end side and deforms in accordance with the received pressure.

FIG. 3 is an exploded perspective view of the piezoelectric unit 50, a guide member 61, a rear-end pressing member 62a, a front-end pressing member 62b, a wire connecting member 63, and an insulator 64.

As shown in FIG. 2, the piezoelectric unit 50 is disposed in the axial hole 39 of the housing 30. The piezoelectric unit 50 includes two piezoelectric elements 51a, 51b and two electrodes 52a, 52b that sandwich the two piezoelectric elements 51a, 51b. The rear-end electrode 52a is a conductive member positioned closer to the rear end relative to the piezoelectric elements 51a, 51b. The front-end electrode 52b is a conductive member positioned closer to the front end relative to the piezoelectric elements 51a, 51b. These four members 51a, 51b, 52a, 52b are four stack members stacked along the axial direction. As shown in FIG. 4, each of the four stack members 51a, 51b, 52a, 52b have a quadrangular prism shape with a rectangular cross section (a square in the present embodiment) perpendicular to the axial line CL.

When the piezoelectric elements 51a, 51b receive a force along the axial line CL, the piezoelectric elements 51a, 51b output electrical charges (e.g., electrical signals) corresponding to the received force via the two electrodes 52a, 52. The piezoelectric element is made using a known piezoelectric material such as titanium oxide or quartz. The electrodes 52a, 52b are made using a known conductive material, which in this embodiment is stainless steel.

The guide member 61 is made using an insulating material such as resin and is a substantially cylindrical member having a through hole 61h extending along the axial line CL, as shown in FIG. 3. As shown in FIG. 2, the guide member 61 is disposed in the axial hole 39 of the housing 30. The piezoelectric unit 50 is housed in the through hole 61h of the guide member 61. That is, the guide member 61 surrounds the outer periphery of the piezoelectric unit 50. The outer diameter of the guide member 61 is sufficiently smaller than the inner diameter of the housing 30 (axial hole 39). Therefore, the guide member 61 and the housing 30 are not in contact with each other.

As shown in FIG. 3, the rear-end pressing member 62a is a member that presses the rear-end electrode 52a in the front-end direction Df. The rear-end pressing member 62a includes a disk-shaped substrate portion 621a and a protruding portion 622a protruding from the front-end surface of the substrate portion 621a to the front-end side. The substrate portion 621a is positioned closer to the rear end than the guide member 61. The front end of the protruding portion 622a is located in the through hole 61h of the guide member 61. The protruding portion 622a has a quadrangular prism shape similar to that of the electrodes 52a, 52b described above. The front-end surface of the protruding portion 622a contacts the rear-end surface of the rear-end electrode 52a in the through hole 61h of the guide member 61 and presses the rear-end surface of the rear-end electrode 52a in the front-end direction Df.

The front-end pressing member 62b is a member that presses the front-end electrode 52b in the rear-end direction Dr. The front-end pressing member 62b includes a disk-shaped substrate portion 621b and a protruding portion 622b protruding from the rear-end surface of the substrate portion 621b to the rear-end side. The substrate portion 621b is positioned closer to the front end than the guide member 61. The rear end of the protruding portion 622b is located in the through hole 61h of the guide member 61. The protruding portion 622b has a quadrangular prism shape. The rear-end surface of the protruding portion 622b contacts the front-end surface of the front-end electrode 52b in the through hole 61h of the guide member 61 and presses the front-end surface of the front-end electrode 52b in the rear-end direction Dr.

The length L1 of the guide member 61 (FIG. 3) along the axial line CL is slightly shorter than the sum of the lengths, along the axial line CL, of the four stack members 51a, 51b, 52a, 52b and the protruding portions 622a, 622b. Consequently, a gap NT is provided between at least one of the front-end surface of the guide member 61 and the substrate portion 621b of the front-end pressing member 62b, and the rear-end surface of the guide member 61 and the substrate portion 621a of the rear-end pressing member 62a. For example, in FIG. 2, a gap NT is provided between the rear-end surface of the guide member 61 and the substrate portion 621a of the rear-end pressing member 62a. As a result, an appropriate preload can be applied to the piezoelectric unit 50 (i.e., the four stack members 51a, 51b, 52a, 52b including the piezoelectric elements 51a, 51b) by the rear-end pressing member 62a and the front-end pressing member 62b. If the gap NT is not provided, the loads from the rear-end pressing member 62a and the front-end pressing member 62b are applied to the guide member 61 so that a sufficient preload cannot be applied to the piezoelectric unit 50.

The wire connecting member 63 is a cylindrical member having an axial hole 63h through the axial line CL. The wire connecting member 63 is in contact with the rear-end side of the rear-end pressing member 62a. The inside surface of the wire connecting member 63 forming the axial hole 63h is connected to a small-diameter conducting wire 77 which is a wire for connecting to an inner conductor 75 of the cable 70, which will be described later.

Each of the rear-end pressing member 62a, the front-end pressing member 62b, and the wire connecting member 63 is made with a conductive material such as a metal (e.g., stainless steel).

The insulator 64 is a cylindrical member having an axial hole 64h through the axial line CL. The insulator 64 insulates the wire connecting member 63 from the rear-end insertion member 92, which will be described later. As a result, short-circuiting between the rear-end side (i.e, the rear-end electrode 52a side) of the piezoelectric elements 51a, 51b and the front-end side (the front-end electrode 52b side) of the piezoelectric elements 51a, 51b is prevented. The insulator 64 is made of an insulating material such as alumina.

The transmission rod 91 is a member having a cylindrical shape and is made of a conductive metal such as stainless steel. The rear-end side of the transmission rod 91 is connected to the front-end pressing member 62b, and the front-end side of the transmission rod 91 is connected to the diaphragm 40.

Specifically, the rear-end surface of the transmission rod 91 is in contact with the front-end surface of the front-end pressing member 62b. As a result, the force applied to the transmission rod 91 from the front-end side toward the rear-end side is transmitted to the piezoelectric unit 50, and thus to the piezoelectric elements 51a, 51b of the piezoelectric unit 50, via the front-end pressing member 62b.

The front-end side of the transmission rod 91 is connected to the central portion of the rear-end surface of the diaphragm 40. The diaphragm 40 and the transmission rod 91 are integrally formed by forging or cutting. The diaphragm 40 and the transmission rod 91 may be formed separately and joined by welding or the like.

When the diaphragm 40 deforms in response to pressure, the deformation is transmitted to the piezoelectric unit 50 by the transmission rod 91.

The rear-end insertion member 92 is a cylindrical member having an axial hole 92h through the axial line CL. The outer diameter of the rear-end insertion member 92 is substantially equal to the inner diameter of the axial hole 39 of the housing 30. The rear-end insertion member 92 is inserted into the axial hole 39 from the rear-end side. The rear-end insertion member 92 is fixed to the housing 30 via, for example, the welding portion WP3 in a state of being pushed in the front-end direction Df with a predetermined preload. As a result, a preload is applied to the piezoelectric unit 50. An appropriate preload is determined in advance based on the output characteristics of the piezoelectric elements 51a, 51b so that pressure can be measured within a range in which the relationship between the load applied to the piezoelectric elements 51a, 51b and the electrical charge output corresponding to the load is stable.

The cover 65 is a tube made of an insulating material such as resin and covers the guide member 61, the rear-end pressing member 62a, the front-end pressing member 62b, the wire connecting member 63, the front-end portion of the insulator 64, and the rear-end portion of the transmission rod 91. The cover 65 is used, for example, to prevent the members from separating and losing operability at the time of assembly. The cover 65 may be omitted.

The cable 70 is disposed on the rear-end side of the front-end unit 100 in the axial hole 29 of the cylindrical metal fitting 20. The cable 70 is a member for transmitting the electrical charge output from the piezoelectric unit 50 to an electric circuit (not shown) for detecting the pressure in the combustion chamber of the internal combustion engine based on the electrical charge outputted from the piezoelectric unit 50. The cable 70 is a coaxial cable, that is, a so-called shielded wire having a multilayer structure for reducing noise. Specifically, the cable 70 includes, from the center toward the outer periphery, an inner conductor 75, an insulator 74, a conductive coating 73, an outer conductor 72, and a jacket 71.

The inner conductor 75 exposed at the front-end portion of the cable 70 is connected to the wire connecting member 63 via a wire composed of a flat plate conducting wire 76 and a small-diameter conducting wire 77. As a result, the cable 70 is electrically connected to the rear-end side of the piezoelectric unit 50 via the flat plate conducting wire 76, the small-diameter conducting wire 77, the wire connecting member 63, and the rear-end pressing member 62a. The above-described configuration for connecting the cable 70 and the piezoelectric unit 50 is one example, but other configurations can be adopted.

Except for the ends, the entire small-diameter conducting wire 77 is covered with an insulating tube 78. As a result, the small-diameter conducting wire 77 and the rear-end insertion member 92 do not come into contact with each other, thereby preventing the front-end side and the rear-end side of the piezoelectric unit 50 from being short-circuited.

A grounding wire 79, extending from the front end of the outer conductor 72 to the extending direction thereof, is connected to the front-end portion of the outer conductor 72. The front-end portion of the grounding wire 79 is joined to the rear-end insertion member 92 by welding. As a result, the external conductor 72 is grounded via the grounding wire 79, the housing 30, and the cylinder head of an internal combustion engine 10.

A-2: Configuration of a Cross Section Through the Piezoelectric Element:

FIG. 4 is a diagram showing a cross section CS of the front-end unit 100 along a plane (a-a plane in FIG. 2) perpendicular to the axial line CL and through the piezoelectric element 51a. A cross section of the front-end unit 100 which passes through the other piezoelectric element 51b and is perpendicular to the axial line CL has the same configuration as that shown in FIG. 4. In FIG. 4, illustration of the cover 65 is omitted.

In the cross section CS, the minimum value of the distance from the center CC1 of the axial hole 39 of the housing 30 to the inside surface of the housing 30 of the axial hole 39 is set as the first distance D1. In the present embodiment, in the cross section CS, since the axial hole 39 is a perfect circle, the distance from the center CC1 to the inside surface of the housing 30 is equal in all circumferential positions. In this case, this distance, at any position in the circumferential direction, is equal to the first distance D1. If the axial hole 39 is not a perfect circle, the distance from the center CC1 to the inside surface of the housing 30 may vary depending on the position in the circumferential direction. In this case, the minimum value among the distances at all circumferential positions is the first distance D1. The area of the first circle having the first distance D1 as a radius is S1 ($S1=\pi(D1)^2$). In the present embodiment, the center CC1 of the axial hole 39 coincides with the axial line CL of the pressure sensor 10 but may be shifted in the radial direction.

In the cross section CS, the maximum value of the distance from the center CC2 of the guide member 61 to the outside surface of the guide member 61 is set as the second distance D2. In the present embodiment, since the outside surface of the guide member 61 is a perfect circle in the cross section CS, the distance from the center CC2 to the outside surface of the guide member 61 is equal in all circumferential positions. In this case, the distance at any circumferential position is equal to the second distance D2. When the outside surface of the guide member 61 is not a perfect circle, the distance from the center CC2 to the outside surface of the guide member 61 may vary depending on the position in the circumferential direction. In this case, the maximum value among the distances at all circumferential positions is the second distance D2. The area of the second circle having the second distance D2 as the radius is S2 ($S2=\pi(D2)^2$). In the present embodiment, the center CC2 of the guide member 61 coincides with the axial line CL of the pressure sensor 10 but may be shifted in the radial direction. In the present embodiment, the ratio of the area S2 to the area S1 is 0.65 or less. That is, $S2/S1 \leq 0.65$ is satisfied.

In the cross section CS, the maximum value of the distance from the center CC3 of the piezoelectric element 51a to the outside surface of the piezoelectric element 51a is set as the third distance D3. In the present embodiment, since the piezoelectric element 51a is rectangular in the cross section CS, the distance from the center CC3 to one vertex of the rectangle is taken as the third distance D3. If the cross section of the piezoelectric element 51*a* is a circle, the radius of the circle becomes the maximum value D3. The area of the third circle having the third distance D3 as a radius is S3 (S3=πD3²). In the example of FIG. 4, the center CC3 of the piezoelectric element 51*a* and the axial line CL of the pressure sensor 10 coincide with each other, but the center CC3 of the piezoelectric element 51*a* may be shifted with respect to the axial line CL at the time of assembly. In the present embodiment, the ratio of the area S3 to the area S1 is 0.5 or less. That is, S3/S1≤0.5 is satisfied.

FIG. 5 is an enlarged view of a portion including the guide member 61 and the piezoelectric element 51*a* of the cross section CS in FIG. 4. In the present embodiment, in the cross section CS, the shape of the through hole 61*h* of the guide member 61 is not a simple circle or a rectangle. That is, the side surfaces of the through hole 61*h* of the guide member 61 include planar flat side surfaces 611 and curvilinear curved side surfaces 612. The flat side surfaces 611 are planes that align with the outside surfaces of the piezoelectric elements 51*a*, 51*b* housed in the through hole 61*h*. The curved side surfaces 612 are side surfaces formed at positions corresponding to verticals of the rectangular cross section of the piezoelectric element 51*a* housed in the through hole 61*h*. The curved side surfaces 612 form substantially columnar holes through axial lines CL at positions that correspond to the vertices of the rectangular cross section of the piezoelectric element 51*a*. By having the curved side surfaces 612, for example, when the piezoelectric elements 51*a*, 51*b* are housed in the through hole 61*h*, it is possible to prevent the corners of the piezoelectric elements 51*a*, 51*b* from interfering with the side surfaces of the through hole 61*h*. As a result, assembling of the pressure sensor 10 is facilitated.

Here, the largest radial distance between the center CC4 of the through hole 61*h* and the center CC3S of the piezoelectric device 51*a* within the through hole 61*h* of the guide member 61 is defined as the fourth distance SL. In the present embodiment, the center CC4 of the through hole 61*h* coincides with the axial line CL of the pressure sensor 10. The center CC4 of the through hole 61*h* also coincides with the center of the guide member 61. The center of the through hole 61*h* may be offset from the center of the guide member 61 or may be offset from the axial line CL of the pressure sensor 10.

The piezoelectric element 51*a*I shown with solid lines in FIG. 5 is disposed at an ideal position from a design perspective. The center CC3I of the ideal piezoelectric element 51*a*I coincides with the axial line CL. The position of the piezoelectric element 51*a*S indicated by the broken lines in FIG. 5 is radially displaced relative to the ideal position from a design perspective. Specifically, the piezoelectric element 51*a*S is disposed at a position where the distance between the center CC4 of the through hole 61*h* and the center CC3S of the piezoelectric element 51*a* is maximized. In the present embodiment, as shown in FIG. 5, the distance between the center CC4 of the through hole 61*h* and the center CC3S of the piezoelectric element 51*a*S is maximized at a position where two outside surfaces of the piezoelectric element 51*a*S come in contact with the corresponding two flat side surfaces 611 of the guide member 61. Therefore, in the embodiment of FIG. 5, the distance between the center CC4 of the through hole 61*h* and the center CC3S of the piezoelectric device 51*a*S indicated by broken lines is the fourth distance SL. Although the center CC2 of the guide member 61 and the center CC4 of the through hole 61*h* of the guide member 61 coincide with each other in the example of FIG. 5, the center CC2 of the guide member 61 and the center CC4 of the through hole 61*h* may be offset from each other. For example, if the through hole 61*h* is displaced with respect to the guide member 61, the center CC2 of the guide member 61 and the center CC4 of the through hole 61*h* of the guide member 61 may be offset from each other.

In FIG. 5, the largest radial distance between the outside surface of the piezoelectric element 51*a*S shifted by the fourth distance SL and the center CC4 of the through hole 61*h* of the guide member 61 is defined as the fifth distance AL. In the example of FIG. 5, the fifth distance AL is the distance between the center CC4 of the through hole 61*h* and the vertex ST. The vertex ST is a vertex of an angle formed by two of the four outside surfaces of the piezoelectric element 51*a*S contacting two flat side surfaces 611 of the guide member 61. In the present embodiment, the ratio of the fourth distance SL with the fifth distance AL is 0.26 or less. That is, SL/AL≤0.26 is satisfied.

A-3: Operation of Pressure Sensor 10

The pressure sensor 10 is mounted in a mounting hole, provided in the cylinder head of an internal combustion engine, which communicates with the combustion chamber. The mounting hole has internal threads, and the threaded portion 22 of the cylindrical metal fitting 20 is secured to the internal threads. In this state, the front end of the front end unit 100 is exposed to the combustion chamber of the internal combustion engine, and the front end surface of the diaphragm 40 is subjected to the pressure of the gas (e.g., fuel gas) in the combustion chamber.

The diaphragm 40 is deformed in response to the pressure in the combustion chamber. The transmission rod 91 is displaced along the axial line CL in response to the deformation of the diaphragm 40, thereby transmitting a load corresponding to the pressure received by the diaphragm 40 to the piezoelectric unit 50 at the rear end side. Charges are generated on the piezoelectric elements 51*a*, 51*b* of the piezoelectric unit 50 corresponding to the load transmitted from the diaphragm 40 through the transmission rod 91. The piezoelectric elements 51 output an electrical charge (e.g., an electrical signal) corresponding to the load through the rear-end electrode 52*a* and the front-end electrode 52*b*. Based on the output electrical signal, the pressure in the combustion chamber is determined.

A-4: Method of Manufacturing the Pressure Sensor 10

Next, a method of manufacturing the pressure sensor 10 will be described. First, the above-described piezoelectric unit 50 is housed in the through hole 61*h* of the guide member 61. The guide member 61 in which the piezoelectric unit 50 is housed, the rear-end pressing member 62*a*, the front-end pressing member 62*b*, the wire connecting member 63 which the small diameter conductor 77 is attached to, and the insulator 64 are stacked and then secured by the cover 65.

Next, the member formed by integrating the diaphragm 40 and the transmission rod 91 is installed in the housing 30. Specifically, the diaphragm 40 is attached to the opening on the front-end side of the housing 30 so that the transmission rod 91 is positioned in the axial hole 39 of the housing 30. In this state, the outer edge of the diaphragm 40 and the ridge of the axial hole 39 are joined together by laser welding; that is, the welding portion WP2 is formed. Thereafter, in the axial hole 39, the above-mentioned members 50, 61, 62*a*, 62*b*, 63, and 64, which are secured together by the cover 65, are attached to the rear-end side of the transmission rod 91. Thereafter, the rear-end insertion member 92 is inserted into the axial hole 39 of the housing 30 until the front-end surface of the rear-end insertion member 92 contacts the rear-end surface of the insulator 64. The rear-end insertion member 92 is further pressed by a predetermined force in the front-end direction Df in order to apply a predetermined preload to the piezoelectric unit 50. In this state, the rear-end insertion member 92 and the housing 30 are joined together by laser welding; that is, the welding portion WP3 is formed. In this way, the front-end unit 100 is completed.

Thereafter, after the small-diameter conducting wire 77 is connected to the cable 70 and the ground conductor 79 is connected to the rear-end insertion member 92, the housing 30 of the front-end unit 100 and the cylindrical metal fitting 20 are joined by laser welding (forming the welding portion WP1). In this way, the pressure sensor 10 is completed.

As described above, the pressure sensor 10 of the first embodiment includes the guide member 61 that surrounds the outer periphery of the piezoelectric elements 51a, 51b, and the fourth distance SL and the fifth distance AL are configured to satisfy SL/AL≤0.26. As a result, it is possible to suppress displacement of the piezoelectric elements 51a and 51b in the radial direction with the guide member 61.

When the temperature of the piezoelectric element increases, the insulation resistance of the piezoelectric element decreases. The lower the insulation resistance, the more the current leaks from the electrode on one side of the piezoelectric element to the electrode on the other side. When the amount of current leaking increases, the amount of electrical charge output corresponding to the pressure deviates from a desired value such that the accuracy of the pressure measurement decreases. In order to prevent this, it is preferable to increase the insulation resistance of the piezoelectric element. The insulation resistance of the piezoelectric element increases as the cross-sectional area perpendicular to the axial line becomes smaller and increases as the length in the axial direction becomes longer. For this reason, in the present embodiment, the length of the entire piezoelectric element in the axial direction is lengthened by stacking two piezoelectric elements 51a and 51b in the axial direction. Further, the diameters of the two piezoelectric elements 51a and 51b in the radial direction are shortened with respect to the diameter of the axial hole 39 of the housing 30 so that the cross-sectional area perpendicular to the axes of the piezoelectric elements is reduced. In addition, when the two piezoelectric elements 51a and 51b are stacked in the axial direction, the amount of electrical charge output corresponding to the pressure increases so that the sensitivity of the pressure sensor 10 to the pressure is improved.

However, the larger the number of the piezoelectric elements stacked and the smaller the cross-sectional area perpendicular to the axial line of the piezoelectric elements, the more likely the piezoelectric elements are to be displaced in the radial direction. Further, the surface of the piezoelectric element is polished in order to evenly apply a preload to the entire surface when a preload is applied and to check the amount of impurities in the piezoelectric element. In these cases, the piezoelectric element is more likely to be displaced in the radial direction. If the piezoelectric element is excessively displaced in the radial direction, a sufficient preload cannot be applied to the piezoelectric element, and the pressure sensor 10 may not be able to detect a stable pressure. For example, there is a possibility that variation in the detection of the pressure will become large due to the differences in operating conditions of the internal combustion engine (e.g., differences in temperature or maximum pressure in the combustion chamber).

In the present embodiment, by providing the guide member 61 surrounding the outer periphery of the piezoelectric unit 50, which include the piezoelectric elements 51a and 51b, it is possible to suppress the displacement of the positions of the piezoelectric elements in the radial direction. In particular, (SL/AL) is set to 0.26 or less so that the length (SL/AL) of the fourth distance SL with respect to the fifth distance AL is sufficiently short. As a result, even if the piezoelectric element 51a is displaced to the maximum extent in the radial direction in the through hole 61h of the guide member 61, the piezoelectric element 51a is displaced only to the extent that the stack members including the piezoelectric elements can be maintained in a stacked configuration. As a result, it is possible to suppress the displacement of the positions of the piezoelectric elements 51a, 51b in the radial direction.

Further, in the present embodiment, the housing 30 and the guide member 61 are not in contact with each other. In addition, S2/S1≤0.65 is satisfied. That is, it is preferable that the ratio, described above, of the area S2 of the second circle, whose radius is the second distance D2, to the area S1 of the first circle, whose radius is the first distance D1, is 0.65 or less. Consequently, the space between the outer surface of the guide member 61 and the inside surface of the housing 30 can be sufficiently maintained so that it is possible to prevent the piezoelectric element from being excessively heated. Further, even when the guide member 61 thermally expands at a high temperature at the time of use, since contact between the housing 30 and the guide member 61 is suppressed, transmission of heat from the combustion chamber to the piezoelectric unit 50 can be suppressed. Therefore, it is possible to prevent the insulation resistance of the piezoelectric elements 51a, 51b in the piezoelectric unit 50 from decreasing. In addition, it is possible to prevent the rear-end side of the piezoelectric unit 50 and the housing 30 from being short-circuited.

Further, in the present embodiment, a gap NT is provided between at least one of either the front-end surface of the guide member 61 and the front-end pressing member 62b, or the rear-end surface of the guide member 61 and the rear-end pressing member 62a, as shown in FIG. 2. As a result, an appropriate preload can be applied to the piezoelectric unit 50, which include the piezoelectric elements 51a and 51b, through the front-end pressing member 62b and the rear-end pressing member 62a.

Further, in the present embodiment, the ratio of the area S3 to the area S1 in the cross section CS is set to 0.5 or less. That is, S3/S1≤0.5 is satisfied. In this case, since the size of the piezoelectric elements 51a, 51b in the radial direction is smaller than the size of the axial hole 39 of the housing 30 in the radial direction, displacement of the piezoelectric elements 51a, 51b in the radial direction can easily occur. In such a case, it is possible to sufficiently suppress radial displacement of the piezoelectric elements 51a, 51b with the guide member 61.

B. Evaluation Tests

Samples of the pressure sensor were prepared and subjected to the first, second and third evaluation tests as described below.

B-1: First Evaluation Test

In the first evaluation test, as shown in Table 1, twelve types of pressure sensor samples A1-A12 were produced and evaluated. Items common to each sample are as follows: Outer diameter of the guide member 61: 2.6 mm Spacing W (FIG. 5) between opposing flat side surfaces 611 of the through hole 61*h*: 1.1 mm axial length of the piezoelectric elements 51*a*, 51*b*: 0.5 mm target preload value: 300 N inner diameter of the housing 30: 4.6 mm

TABLE 1

| Sample No. | SL/AL | Evaluation |
|---|---|---|
| A1 | 0.1 | A |
| A2 | 0.15 | A |
| A3 | 0.2 | A |
| A4 | 0.22 | A |
| A5 | 0.24 | A |
| A6 | 0.26 | A |
| A7 | 0.28 | B |
| A8 | 0.3 | B |
| A9 | 0.32 | B |
| A10 | 0.35 | B |
| A11 | 0.4 | B |
| A12 | 0.5 | B |

In each sample, the value of SL/AL was changed by changing the length of one side of the piezoelectric elements 51*a*, 51*b* in the radial direction. As the length of one side of the piezoelectric elements 51*a*, 51*b* in the radial direction becomes shorter, SL/AL becomes larger. In the twelve samples A1-A12, (SL/AL) was set to 0.1, 0.15, 0.2, 0.22, 0.24, 0.26, 0.28, 0.3, 0.32, 0.35, 0.4, and 0.5, respectively, as shown in Table 1.

In the evaluation test, each sample was assembled according to the manufacturing method described above. The samples to which a predetermined preload could not be applied at the time of assembly were evaluated as "B". For samples to which a predetermined preload could be applied, the sample was further installed in a chamber to which a dynamic pressure of 2 MPa was applied and waveforms outputted from the sample were checked. As a result, the samples in which the output waveform could not be checked were evaluated as "B" and the samples in which the output waveform could be checked were evaluated as "A". In the samples in which the predetermined preload could not be applied, it is considered that the predetermined preload could not be applied because the piezoelectric elements 51*a*, 51*b* were displaced in the radial direction at the time of assembly. In addition, in the samples in which the output waveform could not be checked, it is considered that the output waveform could not be output to the outside because the piezoelectric elements 51*a*, 51*b* were displaced in the radial direction.

The evaluation results are shown in Table 1. Samples A7-A12 in which (SL/AL) exceeded 0.26 were all evaluated as "B". Samples A1-A6 in which (SL/AL) was 0.26 or less were all evaluated as "A".

As understood from the above description, the first evaluation test confirms that the displacement of the positions of the piezoelectric elements 51*a*, 51*b* in the radial direction can be suppressed by satisfying SL/AL≤0.26.

B-2: Second Evaluation Test

In the second evaluation test, as shown in Table 2, fourteen types of pressure sensor samples B1-B14 were produced and evaluated. In each sample, the length of one side of the piezoelectric elements 51*a*, 51*b* in the radial direction is set to a constant value that satisfies SL/AL=0.17. Further, in each sample, the second distance D2 is changed by changing the outer diameter of the guide member 61. As a result, the value of S2/S1 is changed. Specifically, in the fourteen samples B1-B14, (S2/S1) was set to 0.3, 0.35, 0.4, 0.45, 0.5, 0.55, 0.6, 0.65, 0.7, 0.75, 0.8, 0.85, 0.9, and 0.95, respectively, as shown in Table 2. The other dimensions and the preload were the same as the dimensions and preload of the samples in the first evaluation test.

TABLE 2

| Sample No. | S1/S2 | Evaluation |
|---|---|---|
| B1 | 0.3 | A |
| B2 | 0.35 | A |
| B3 | 0.4 | A |
| B4 | 0.45 | A |
| B5 | 0.5 | A |
| B6 | 0.55 | A |
| B7 | 0.6 | A |
| B8 | 0.65 | A |
| B9 | 0.7 | B |
| B10 | 0.75 | B |
| B11 | 0.8 | B |
| B12 | 0.85 | B |
| B13 | 0.9 | B |
| B14 | 0.95 | B |

In the evaluation test, each sample was assembled according to the manufacturing method described above. An actual machine evaluation test was performed using each sample. Specifically, a sample sensor and a target pressure sensor (also referred to as a "target sensor") were attached to the same cylinder (i.e., a combustion chamber) of an internal combustion engine, and the internal combustion engine was operated to acquire pressure waveforms from each of the sample sensor and the target sensor. An inline four cylinder engine with an exhaust volume of 1.3 L was used as an internal combustion engine and natural intake air was used. The internal combustion engine was operated under conditions in which the temperature in the combustion chamber was highest, specifically, under conditions in which the throttle was fully open (i.e., WOT (Wide-Open Throttle)) and the rotational speed was 4500 rpm.

FIG. 6 is a graph showing an example of a waveform of the pressure measured by the pressure sensor. The horizontal axis represents the crank angle CA, and the vertical axis represents the pressure in kPa. A crank angle CA of zero degrees indicates top dead center. In the graph, the pressure G1 (also referred to as the target pressure) measured by the target sensor and the pressure G2 (also referred to as the sample pressure) measured by the sample sensor are shown. Since the target sensor is adjusted beforehand so that the pressure can be measured with sufficiently good accuracy, no current leakage occurs between the electrodes of the piezoelectric element. In this evaluation test, the sample pressure G2 and the target pressure G1 were measured over five cycles. The difference Em between the two pressures G1 and G2, at a predetermined time at which the pressure in the combustion chamber becomes a relatively low base pressure, is then specified for each cycle. The average value of the five differences Em was calculated and referred to as the pressure error Ep of the sample. This pressure error Ep is considered to be an error occurring in a sample due to the occurrence of current leakage between the electrodes of the piezoelectric element and is also referred to as a drift amount.

Samples in which the drift amount Ep is equal to or less than the 200 kPa value were evaluated as "A", and samples in which the drift amount Ep exceeded the 200 kPa value were evaluated as "B".

The evaluation results are shown in Table 2. Samples B9-B14 in which (S2/S1) exceeded 0.65 were all evaluated as "B". Samples B1-B8 in which (S2/S1) was 0.65 or less were all evaluated as "A".

The reason for this is considered as follows: In samples B1-B8 in which S2/S1 was 0.65 or less, since the gap between the housing 30 and the guide member 61 could be sufficiently secured and overheating of the piezoelectric elements 51a, 51b could be suppressed, decrease in the insulation resistance of the piezoelectric elements 51a, 51b in the piezoelectric unit 50 was suppressed. Consequently, the amount of drift Ep could be reduced by suppressing the current leakage between the electrodes of the piezoelectric element.

As understood from the above description, it was confirmed by the second evaluation test that overheating of the piezoelectric elements 51a, 51b can be suppressed by satisfying S2/S1≤0.65.

B-3: Third Evaluation Test

In the third evaluation test, as shown in Table 3, sixteen types of pressure sensor samples C1-C16 were produced and evaluated. In each sample, the third distance D3 is changed by changing the length of one side of the piezoelectric elements 51a, 51b in the radial direction. As a result, the value of S3/S1 is changed. Specifically, in the sixteen samples C1-C16, (S3/S1) were set to 0.1, 0.2, 0.3, 0.35, 0.4, 0.45, 0.5, 0.55, 0.6, 0.65, 0.7, 0.75, 0.8, 0.85, 0.9, and 0.95, respectively, as shown in Table 3. Further, the dimension of the through hole 61h of the guide member 61, specifically, the interval W (see FIG. 5) between the flat side surfaces 611 facing each other in the through hole 61h, is determined in accordance with the length of one side in the radial direction of the piezoelectric elements 51a, 51b so as to satisfy (SL/AL)=0.17. The other dimensions and preload were the same as the dimensions and preload of the samples in the second evaluation test.

TABLE 3

| Sample No. | S3/S1 | Without Guide Member | With Guide Member |
| --- | --- | --- | --- |
| C1 | 0.1 | B | A |
| C2 | 0.2 | B | A |
| C3 | 0.3 | B | A |
| C4 | 0.35 | B | A |
| C5 | 0.4 | B | A |
| C6 | 0.45 | B | A |
| C7 | 0.5 | B | A |
| C8 | 0.55 | A | — |
| C9 | 0.6 | A | — |
| C10 | 0.65 | A | — |
| C11 | 0.7 | A | — |
| C12 | 0.75 | A | — |
| C13 | 0.8 | A | — |
| C14 | 0.85 | A | — |
| C15 | 0.9 | A | — |
| C16 | 0.95 | A | — |

In the evaluation test, first, each sample was assembled according to the manufacturing method described above but without using the guide member 61. Samples to which the predetermined preload could not be applied at the time of assembly were evaluated as "B". Samples to which a predetermined preload was applied were evaluated as "A". Further, samples to which a predetermined preload could not be applied were assembled using the guide member 61 according to the above-described manufacturing method. The assembled samples were then installed in a chamber in which the dynamic pressure of 2 MPa was applied, and waveforms outputted from the samples were checked. As a result, the samples in which the output waveform could not be checked were evaluated as "B" and the samples in which the output waveform could be checked were evaluated as "A".

The evaluation results are shown in Table 3. In the cases where the guide member 61 was not used, samples C1-C7 in which (S3/S1) was 0.5 or less were all evaluated as "B". In the cases where the guide member 61 was not used, samples C8-C16 in which (S3/S1) exceeded 0.5 were all evaluated as "A". That is, a sample in which (S3/S1) exceeds 0.5 can be assembled without using the guide member 61, but a sample in which (S3/S1) is 0.5 or less cannot be assembled without using the guide member 61.

In the cases where the guide member 61 is used, all of the samples in which (S3/S1) is 0.5 or less were evaluated as "A". That is, when the guide member 61 is used, even a sample in which S3/S1 is 0.5 or less can be assembled.

As understood from the above description, in samples in which (S3/S1) was 0.5 or less, since the diameters of the piezoelectric elements 51a, 51b in the radial direction are small with respect to the diameter of the axial hole 39 in the housing 30, it was confirmed that the piezoelectric elements 51a, 51b could not be assembled without using the guide member 61 but could be assembled by using the guide member 61.

C. Modification (1) In the above embodiment, the piezoelectric unit 50 includes two piezoelectric elements 51a, 51b. The number of piezoelectric elements is not limited to this and may be one or three or more. In the case in which the piezoelectric unit 50 includes two or more piezoelectric elements, it is considered that the displacement of the piezoelectric element in the radial direction is a problem that is likely to occur. The displacement of the piezoelectric element in the radial direction, however, can be suppressed by the guide member 61.

(2) In the above embodiment, (S2/S1)≤0.65 is satisfied, but (S2/S1)≤0.65 need not be satisfied. In this case, the piezoelectric elements 51a, 51b are more likely to reach a high temperature than in the case where (S2/S10)≤0.65 is satisfied. However, if SL/AL≤0.26 is satisfied, radial displacement of the piezoelectric elements 51a, 51b can be suppressed.

(3) In the above embodiment, (S3/S1)≤0.5 is satisfied, but (S3/S1)≤0.5 need not be satisfied. In this case, although the pressure sensor 10 can be assembled without using the guide member 61, using the guide member 61 can suppress the radial deviation of the piezoelectric elements 51a, 51b as compared to the case in which the guide member 61 is not used.

(4) In the above embodiment, a gap NT is formed between at least one of the front-end surface of the guide member 61 and the substrate portion 621b of the front-end pressing member 62b, or the rear-end surface of the guide member 61 and the substrate portion 621a of the rear-end pressing member 62a. Alternatively, the gap NT may not be formed. For example, even when there is no gap NT, if the guide member 61 is made of an elastic material that can be deformed in the axial direction, such as an elastomer or a rubber, a preload can be applied to the piezoelectric unit 50 with the front-end pressing member 62b and the rear-end pressing member 62a.

(5) The cross section perpendicular to the axes of the piezoelectric elements 51a, 51b is not limited to a rectangle, and may be a circle or another polygon (e.g., a pentagon or a hexagon). In this case, it is preferable to also appropriately change the shape of the through hole 61h of the guide member 61 in accordance with the shape of the piezoelectric elements 51a, 51b. Regardless of the shape of the piezoelectric elements 51a, 51b or the shape of the through hole 61h of the guide member 61, it is preferable that SL/AL≤0.26 is satisfied. By doing so, it is possible to suppress displacement of the piezoelectric elements 51a, 51b in the radial direction.

(6) The specific configuration of each member constituting the pressure sensor 10, for example, the shapes of the members 40, 50, 91, 63, 64, 92, are examples, and various other configurations may be adopted. The material such as stainless steel used in the description of each member is an example, and various other materials may be adopted. For example, part or all of the transmission rod 91 may be a hollow cylindrical member, or may have a rectangular-rod shape or a rectangular-tube shape. Further, the rear-end insertion member 92 may be a screw member having external threads formed on the outer peripheral surface thereof. In this case, internal threads are formed on the inner peripheral surface of the axial hole 39 in the housing 30, and the rear-end insertion member 92 is screwed into the internal threads, whereby the rear-end insertion member 92 is secured to the housing 30. In this case, the preload applied to the piezoelectric unit 50 is adjusted by the extent to which the rear-end insertion member 92 is screwed in.

(7) In the above embodiment, the guide member 61 surrounds the entire outer periphery of the piezoelectric unit 50 but does not necessarily surround the entire outer periphery of the piezoelectric unit 50. For example, in the piezoelectric unit 50, the front-end electrode 52b positioned at the most front-end side may be surrounded by the guide member 61 only at a part of the rear-end side. The rear-end electrode 52a located at the most rear-end side of the piezoelectric unit 50 may be surrounded by the guide member 61 only at apart of the front-end side.

Various other configurations can be adopted for the piezoelectric unit 50 instead of the configurations shown in FIGS. 2 and 3. For example, the rear-end electrodes 52a, 52b may be omitted, and the rear-end pressing member 62a and the front-end pressing member 62b may directly contact the piezoelectric elements 51a, 51b.

Although the present invention has been described above based on embodiments and modified examples, the embodiments of the present invention described above are for facilitating understanding of the present invention and are not intended to limit the present invention. The present invention may be modified and improved without departing from the spirit and scope of the claims and the invention includes equivalents thereof.

This application is based on Japanese Patent Application No. 2016-209297, filed on Oct. 26, 2016, the contents of which are incorporated herein by reference.

INDUSTRIAL APPLICABILITY

The pressure sensor of the present invention suppresses displacement of piezoelectric elements in the radial direction and can accurately measure the pressure in a combustion chamber of an internal combustion engine, for example.

DESCRIPTION OF REFERENCE NUMERALS

10 . . . pressure sensor,
20 . . . cylindrical metal fitting,
22 . . . threaded portion,
24 . . . tool engaging portion,
29 . . . axial hole,
30 . . . housing (member),
31 . . . large outer diameter portion,
32 . . . medium outer diameter portion,
33 . . . small outer diameter portion,
39 . . . axial hole,
40 . . . diaphragm,
50 . . . piezoelectric unit,
51a, 51b . . . piezoelectric elements,
52a . . . rear-end electrode,
52b . . . front-end electrode,
61 . . . guide member,
61h . . . through hole,
62a . . . rear-end pressing member,
62b . . . front-end pressing member,
63 . . . wire connecting member,
64 . . . insulator,
65 . . . cover,
70 . . . cable,
71 . . . jacket,
72 . . . outer conductor,
73 . . . conductive coating,
74 . . . insulator,
75 . . . inner conductor,
76 . . . flat wire,
70 . . . connecting member,
70 . . . cable end conductor,
76 . . . flat plate conducting wire,
77 . . . small-diameter conducting wire,
78 . . . tube,
79 . . . grounding wire,
91 . . . transmission rod,
92 . . . rear-end insertion member,
100 . . . front-end unit.

The invention claimed is:

1. A pressure sensor comprising:
a cylindrical housing extending along an axial line;
a diaphragm, which is fixed to a front-end side of the housing, and which is deformable in response to received pressure;
a piezoelectric unit, which is disposed in a hole in the housing, and which comprises two or more stack members including one or more piezoelectric elements; and
a transmission member that transmits a deformation of the diaphragm to the piezoelectric unit, wherein:
the pressure sensor further comprises a guide member, which has a through hole extending along the axial line, and which surrounds at least a part of an outer periphery of the piezoelectric unit; and
in a cross section perpendicular to the axial line passing through the piezoelectric element, the following relationship is satisfied:

$$(SL/AL) \leq 0.26$$

where SL is a maximum radial distance between a center of the through hole and a center of the piezoelectric element in the through hole, and
AL is a maximum radial distance between an outside surface of the piezoelectric element and the center of the through hole.

2. The pressure sensor according to claim 1, wherein:
the guide member is not in contact with the housing; and
in the cross section, the following relationship is satisfied:

$$(S2/S1) \leq 0.65$$

where S1 is an area of a first circle with a radius equal to a minimum distance D1 from a center of the hole in the housing to an inside surface of the housing, and S2 is an area of a second circle with a radius equal to a maximum distance D2 from a center of the guide member to an outside surface of the guide member.

3. The pressure sensor according to claim 1, wherein:
the stack members include a rear-end stack member provided at a rear-end side of the piezoelectric element and a front-end stack member provided at a front-end side of the piezoelectric element;
the pressure sensor further comprises a rear-end pressing member that presses the rear-end stack member in a front-end direction and a front-end pressing member that presses the front-end stack member in a rear-end direction; and
a gap is provided between at least one of: the front-end surface of the guide member and the front-end pressing member; and the rear-end surface of the guide member and the rear-end pressing member.

4. The pressure sensor according to claim 2, wherein in the cross section, the following relationship is satisfied:

$$(S3/S1) \leq 0.5$$

where S3 is an area of a third circle with a radius equal to a maximum distance D3 from the center of the piezoelectric element to an outside surface of the piezoelectric element.

5. The pressure sensor according to claim 1, wherein the piezoelectric unit includes two or more piezoelectric elements.

6. The pressure sensor according to claim 1, wherein the maximal radial distance AL is defined between the center of the through hole and a vertex, wherein the vertex is a vertex of an angle formed by two outside surfaces of the piezoelectric element when contacting two flat side surfaces of the guide member.

* * * * *